O. P. FRITCHLE.
TESTING DEVICE FOR ACCUMULATORS.
APPLICATION FILED DEC. 27, 1909.
1,136,789.
Patented Apr. 20, 1915.
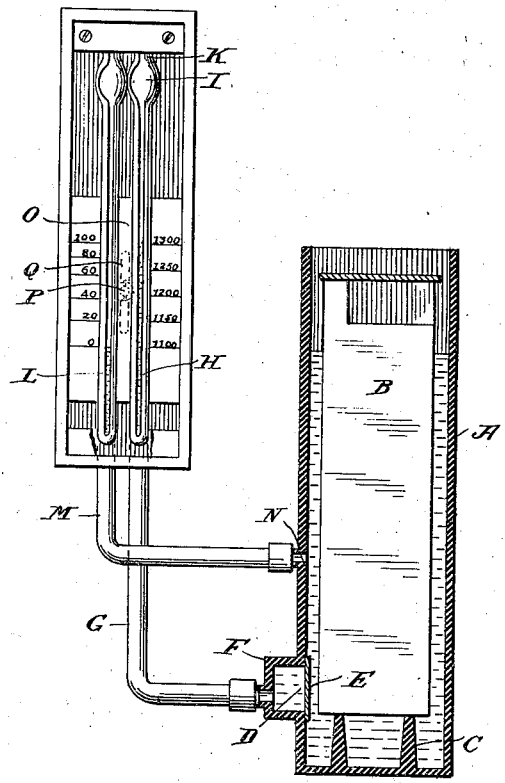
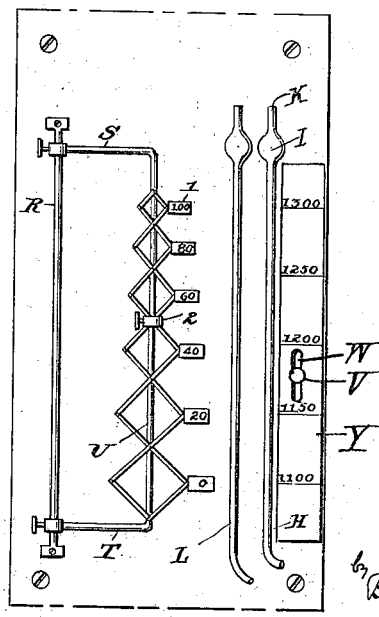
Witnesses:
C. H. Potter
A. M. Scott
Inventor:
Oliver P. Fritchle
by Byrnes Townsend Brickenstein,
Att'ys.

UNITED STATES PATENT OFFICE.

OLIVER P. FRITCHLE, OF DENVER, COLORADO, ASSIGNOR TO THE FRITCHLE AUTOMOBILE AND BATTERY COMPANY, OF DENVER, COLORADO, A CORPORATION OF COLORADO.

TESTING DEVICE FOR ACCUMULATORS.

1,136,789.    Specification of Letters Patent.    Patented Apr. 20, 1915.

Application filed December 27, 1909. Serial No. 534,973.

*To all whom it may concern:*

Be it known that I, OLIVER P. FRITCHLE, a citizen of the United States, residing at Denver, in the county of Denver and State of Colorado, have invented certain new and useful Improvements in Testing Devices for Accumulators, of which the following is a specification.

My invention relates to a device which will enable the state of charge of a storage battery to be ascertained, and is particularly intended for use on electric automobiles, where it is often of great importance to know the condition of charge or discharge of the battery. Usually, the operator wishes to know how many miles the machine will run before the battery gives out, and I have devised a scale attachment by which this information can be read directly from the scale of the instrument, and have also provided an adjustable indicator adapted to enable readings to be taken from the scale under the varying conditions of use of the automobile, as in rough or smooth country, as well as under the varying capacity of the battery due to its length of use.

In the drawings,—Figure 1 is an elevation of the apparatus, parts being shown in section; and Fig. 2 is an elevation showing a modified form of scale indicator.

Referring to Fig. 1, A is a battery cell, shown as of the usual storage-battery type. B is one plate of the battery, resting on supports C. The wall of the cell has near the bottom an opening D, across which is placed a flexible diaphragm E of some thin material, such as rubber, which is not affected by the solution used in the cell. The flexible diaphragm may be cemented to the cell, or, when the cell is of hard rubber, may be formed integrally therewith during the vulcanization. Surrounding the opening is a chamber F which is connected by a tube G to a glass tube H having a bulb or expansion I at the top, and a small vent opening K, the chamber and connected tubes containing a liquid of less specific gravity than that contained in the cell A. As such a liquid may be used sulfuric acid of 1.100 specific gravity, colored with some material such as fuchsin, though any other liquid of different specific gravity from that used in the cell may be used, care being taken that such liquid is not of a kind to injuriously affect the battery plates in case of its accidental admission to the battery cell. When the cell is of the type in which sulfuric acid is used, this acid before charging is of about 1.100 specific gravity, while then fully charged it is of about 1.300 specific gravity. The colored liquid in the tube H, when the battery is fully charged stands at a level above that of the liquid in the cell, the flexible diaphragm serving to transmit the hydrostatic pressure from one column to the other, while keeping the liquids separated. I prefer to provide the device with a second glass tube L connected by a tube M to an opening N in the wall of the cell A, this tube serving as an indicator of the level of the liquid in the cell. Mounted back of the tubes is a scale-plate O, adjustably secured to a support by means of a thumb-screw P, engaging the sides of a slot Q in said support. This scale plate is provided with graduations, two sets being shown, though one only may be used. One set of graduations is marked as from specific gravity 1.100 to specific gravity 1.300; the other being marked from 0–100 to indicate miles. As the rate at which energy is supplied depends on a number of conditions, such as the rate of drop in voltage of the battery, its increase in internal resistance and decrease in rate of supply of acid to the active material, and is not directly proportional to the change of specific gravity in the battery, the intervals between these mile graduations must gradually decrease from the bottom to the top.

In Fig. 2 I have shown a modified form of adjustable scale, supported on a rod R, and having arms S, T, adjustably secured to said rod R, and a vertical connecting piece U, on which is mounted a "lazy-tongs" device carrying at certain of its angles, plates 1 on which the scale indications are marked. A clamping device 2 carried by one member of the "lazy-tongs" and engaging the rod U serves to hold the scale in its adjusted position. The levers of the "lazy-tongs" are made longer at the bottom than at the top in order that proper relative indications may be obtained, as above stated. By this device the intervals between the scale indications may be varied, while the relative lengths of such intervals is maintained.

In operation, the level of the liquid in the cell will be shown in the tube L. The zero of the scale is then adjusted to correspond with this level. The indications afforded by the level of the liquid in the tube L are also useful in enabling the operator to ascertain whether the cell is kept properly filled. The gradual change of level of the liquid in the tube H will indicate the change in specific gravity of the battery fluid, which can be read on the specific gravity scale, and the quantity of energy output of which the battery is capable will be indicated on the other scale in miles which the machine can run.

The specific gravity scale Y may be adjusted and held in place by the screw V, the stem of which passes through the slot VV into the back plate.

The adjustable miles-indicating scale shown in Fig. 2 provides a means for proper adjustment of the scale indications for varying conditions of use. Thus with a given battery, a machine may be capable of making 100 miles on good country roads, more than that distance on city streets, and less on hilly or muddy roads. By opening out the lazy-tongs, the proper maximum indication can be brought into correspondence with the maximum-charge indication as shown by the colored liquid.

A few mileage tests made in the locality where the machine is to be used, will enable the scale to be adjusted to correspond with the total mileage the machine is capable of making in that locality.

By the term "means for hydrostatically connecting" as used in the claims, is meant any means by which the variations of pressure, due to change of density of the liquid in the battery cell, are transmitted to the liquid in the indicating tube, while keeping the two liquids separated. While I prefer to use in the indicating tube a liquid of less specific gravity than that contained in the battery cell, obviously a liquid of the same or even greater specific gravity may be used.

I claim:

1. The combination with a battery cell containing an electrolyte whose specific gravity is variable, of a tube containing liquid of constant specific gravity, means for hydrostatically connecting the liquid in the cell and that in the tube, and a graduated scale arranged to indicate changes of liquid level in the tube.

2. The combination with a battery cell containing an electrolyte whose specific gravity is variable, of a tube containing liquid of constant specific gravity, a flexible diaphragm separating the liquid in the cell from that in the tube, and a graduated scale arranged to indicate changes of liquid level in the tube.

3. The combination with a battery cell containing an electrolyte whose specific gravity is variable, of a tube containing liquid of constant specific gravity, means for hydrostatically connecting the liquid in the cell and that in the tube, and a graduated scale arranged to indicate changes of liquid level in the tube, the graduations also arranged to indicate the degree of energy consumption.

4. The combination with a battery cell containing an electrolyte whose specific gravity is variable, of a tube containing liquid of constant specific gravity, a flexible diaphragm separating the liquid in the cell from that in the tube, and a graduated scale arranged to indicate changes of liquid level in the tube, the graduations also arranged to indicate the degree of energy consumption.

5. The combination with a battery cell containing an electrolyte whose specific gravity is variable, of a tube containing a liquid of constant specific gravity and opening into the cell near its base; means separating the liquid in the tube from that in the cell, said means being yieldable in accordance with the hydrostatic pressure in the cell; means for indicating the level of the liquid in the cell, and a scale-carrying member arranged in coöperative relation to said tube and last-named means and adjustable to conform to such indicated liquid level and provided with graduations to coöperate with the liquid level in the first-named tube.

6. The combination with a battery cell containing an electrolyte whose specific gravity is variable, of a tube containing a liquid of constant specific gravity and opening into the cell near its base; means separating the liquid in the tube from that in the cell, said means being yieldable in accordance with the hydrostatic pressure in the cell; a scale-carrying member arranged in coöperative relation to said tube and provided with graduations to coöperate with the liquid level in the tube.

7. The combination with a battery cell containing an electrolyte whose specific gravity is variable, of a tube containing liquid of constant specific gravity, means for hydrostatically connecting the liquid in the cell and that in the tube, and a graduated scale arranged to indicate changes of liquid level in the tube, comprising graduations at unequal intervals and means for relative adjustment of the graduations.

8. The combination with a battery cell containing an electrolyte whose specific gravity is variable, of a tube containing liquid of constant specific gravity, a flexible diaphragm separating the liquid in the cell from that in the tube, and a graduated scale arranged to indicate changes of liquid level in the tube comprising graduations at unequal intervals and means for relative adjustment of the graduations.

9. In combination with a battery cell, an energy-content indicator comprising a column of liquid, the level of which is changed by changes in the specific gravity of electrolyte in the battery cell, and a graduated scale arranged to indicate the changes in level of the column of liquid, the graduations of said scale being at unequal intervals and means for relative adjustment of the graduations.

10. In combination with a battery cell, an energy-content indicator comprising a flexible diaphragm separating two bodies of liquid one of said liquids being of constant specific gravity and serving as an indicating agent, and the other an electrolyte of variable specific gravity serving to distend the diaphragm and exert pressure upon the indicating liquid changing its level corresponding to changes in the specific gravity of the electrolyte, and a graduated scale arranged to indicate the changes in level of the indicating liquid, said graduations being at unequal intervals and means for relative adjustments of the graduations.

11. The combination with a battery cell containing an electrolyte whose specific gravity is variable, of a tube adapted to contain an indicating liquid, means between the two liquids responding to variations in specific gravity of the electrolyte and serving to change the level of the liquid in the tube, thereby indicating the energy-content of the cell.

12. The combination with a battery cell containing an electrolyte whose specific gravity is variable, of a tube adapted to contain an indicating liquid, a flexible diaphragm separating the indicating liquid from the electrolyte, and adapted by changes in the specific gravity of the electrolyte to variably press the indicating liquid, thereby indicating the energy-content of the cell.

In testimony whereof, I affix my signature in presence of two witnesses.

OLIVER P. FRITCHLE.

Witnesses:
J. R. REED,
M. A. ELLIS.